United States Patent
Chan et al.

(10) Patent No.: US 8,259,774 B2
(45) Date of Patent: Sep. 4, 2012

(54) SPREAD SPECTRUM CLOCK SIGNAL GENERATOR

(75) Inventors: Chien-Yu Chan, Hsinchu (TW); Shao-Ping Hung, Hsinchu (TW); Jun-Ren Shih, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 762 days.

(21) Appl. No.: 12/478,166

(22) Filed: Jun. 4, 2009

(65) Prior Publication Data

US 2009/0323768 A1 Dec. 31, 2009

(30) Foreign Application Priority Data

Jun. 27, 2008 (TW) ................. 97124104 A

(51) Int. Cl.
 *H04B 1/00* (2006.01)
 *H04L 7/00* (2006.01)
(52) U.S. Cl. ........ 375/130; 375/135; 375/136; 375/140; 375/260; 375/354
(58) Field of Classification Search .......... 375/130–153, 375/354–376
See application file for complete search history.

(56) References Cited

U.S. PATENT DOCUMENTS 6,292,507 B1 * 9/2001 Hardin et al. ................. 375/130
7,215,165 B2 * 5/2007 Yamamoto et al. ........... 327/156

* cited by examiner

*Primary Examiner* — David Ometz
*Assistant Examiner* — Ross Varndell

(57) ABSTRACT

A spread spectrum clock signal generator for spreading an input clock signal into an output clock signal includes a clock signal delay chain for delaying the input clock signal into a delay clock signal group having a plurality of delay clock signals, a modulation controller for outputting a counter clock signal control signal, a clock signal selection circuit for selecting, from the delay clock signal group, a modulation clock signal group having a plurality of modulation clock signals, a programmable counter for generating a counting value according to a counter clock signal, and a clock signal output unit for combining the modulation clock signals into the output clock signal according to the counting value, and further generating the counter clock signal, outputted to the programmable counter, according to the counter clock signal control signal.

16 Claims, 7 Drawing Sheets

SPREAD SPECTRUM CLOCK SIGNAL GENERATOR

This application claims the benefit of Taiwan application Serial No. 97124104, filed Jun. 27, 2008, the subject matter of which is incorporated herein by reference.

BACKGROUND OF THE INVENTION

1. Field of the Invention

The invention relates in general to a spread spectrum clock signal generator (SSCG) for spreading a clock signal to reduce the electronic magnetic interference (EMI) of an electronic system.

2. Description of the Related Art

In an electronic system, when the EMI problem is encountered, the clock signal may be spread to reduce the EMI. When the frequency of the input clock signal is changed with time, the clock signal may be spread.

At present, most spectrum spreading techniques are achieved using a phase locked loop (PLL). FIG. 1 (Prior Art) is a block diagram showing a conventional phase locked loop (PLL) 100. Referring to FIG. 1, the PLL 100 includes a phase frequency detector (PFD) 110, a charge pump (CP) 120, a filter 130, a voltage controlled oscillator (VCO) 140 and a frequency divider 150.

The PHD 110 compares an input clock signal IN with an output signal of the frequency divider 150 and thus generates control signals UP or DN. The charge pump 120 controls a voltage V to rise or fall according to the control signals UP or DN. The waveform of the voltage V is also shown in FIG. 1. The filter 130 filters the noise of the voltage V. The VCO 140 generates an output clock signal OUT according to the voltage V.

However, the PLL has the drawbacks of the high circuit complexity and the high circuit cost. So, there is a need to provide a spread spectrum clock signal generator capable of effectively spreading the clock signal and thus reducing the EMI problem, wherein the circuit complexity of the generator is not high and the circuit cost thereof is low.

SUMMARY OF THE INVENTION

Example of the invention is directed to a spread spectrum clock signal generator for spreading an input clock signal into a clock signal, which can be used as a clock signal source of an electronic system so that a problem of electronic magnetic interference (EMI) of the electronic system can be reduced.

Example of the invention is directed to a spread spectrum clock signal generator capable of effectively preventing the problems of glitch and signal discontinuity during the spectrum spread procedure so that the system performance can be enhanced.

Example of the invention is directed to a spread spectrum clock signal generator, which is for the spectrum spreading of a high-frequency input clock signal without dividing the frequency of the input clock signal.

Example of the invention is directed to a spread spectrum clock signal generator capable of generating various output clock signals in a highly flexible manner by changing the modulation.

According to an example of the invention, a spread spectrum clock signal generator for spreading an input clock signal into an output clock signal is provided. The spread spectrum clock signal generator includes a clock signal delay chain, a modulation controller, a clock signal selection circuit, a programmable counter and a clock signal output unit. The clock signal delay chain delays the input clock signal into a delay clock signal group having a plurality of delay clock signals. The modulation controller outputs a counter clock signal control signal. The clock signal selection circuit coupled to the clock signal delay chain selects, from the delay clock signal group, a modulation clock signal group having a plurality of modulation clock signals. The programmable counter generates a counting value according to a counter clock signal. The clock signal output unit is coupled to the modulation controller, the programmable counter and the clock signal selection circuit. The clock signal output unit combines the modulation clock signals into the output clock signal according to the counting value, and the clock signal output unit generates the counter clock signal, outputted to the programmable counter, according to the counter clock signal control signal.

Examples of the invention will become apparent from the following detailed description of the preferred but non-limiting embodiments. The following description is made with reference to the accompanying drawings.

DETAILED DESCRIPTION OF THE INVENTION

In embodiments of the invention, a clock signal delay chain is utilized to generate a plurality of delay clock signals having different phases. Some are selected from the delay clock signals and then combined into an output clock signal. The obtained output clock signal may be used as a clock signal source of an electronic system in order to reduce the EMI problem of the electronic system.

First Embodiment

Figure 1:
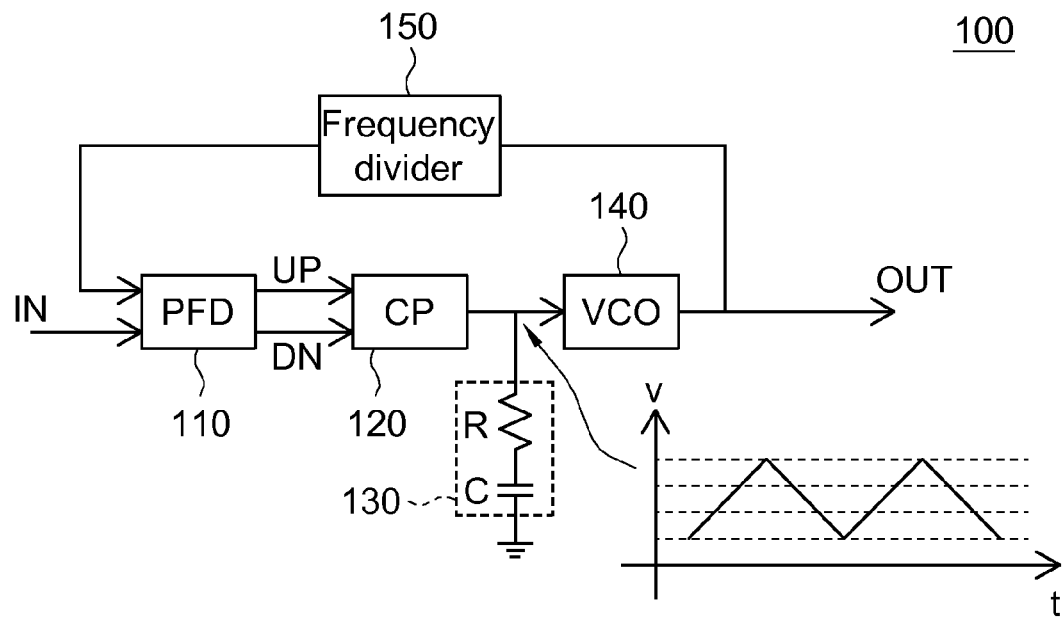
FIG. 1 is a block diagram showing a conventional phase locked loop (PLL).
Figure 2:
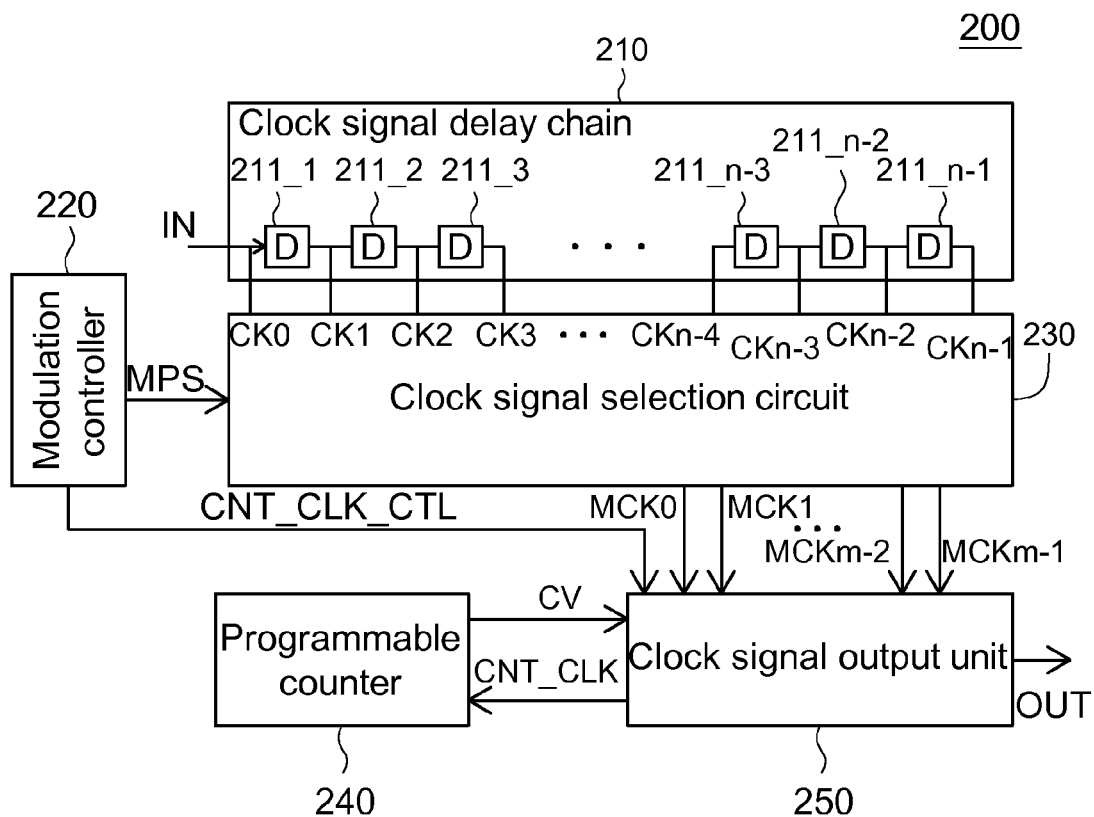
FIG. 2 is a circuit block diagram showing a spread spectrum clock signal generator according to a first embodiment of the invention.

FIG. 2 is a circuit block diagram showing a spread spectrum clock signal generator 200 according to a first embodiment of the invention. Referring to FIG. 2, the spread spectrum clock signal generator 200 includes a clock signal delay chain 210, a modulation controller 220, a clock signal selection circuit 230, a programmable counter 240 and a clock signal output unit 250. The spread spectrum clock signal generator 200 spreads an input clock signal IN into an output clock signal OUT.

The clock signal delay chain 210 delays the input clock signal IN into a plurality of delay clock signals CK0 to CKn- 1. The clock signal delay chain 210 includes a plurality of cascaded delaying units (D)211_1 to 211_n-1, wherein n is a positive integer. Each delaying unit outputs a respective delay clock signal. For example, the delaying unit 211_3 delays the delay clock signal CK2 into the delay clock signal CK3. The delay clock signal CK0 is the input clock signal IN. The delaying unit is, for example, a logic gate, a resistor-capacitor (RC) circuit or a metal-oxide-semiconductor (MOS) circuit. The delaying unit may be analog or digital.

The modulation controller 220 outputs a counter clock signal control signal CNT_CLK_CTL to the clock signal output unit 250 to control a counter clock signal CNT_CLK generated by the clock signal output unit 250. The modulation controller 220 outputs a modulation pattern signal MPS to the clock signal selection circuit 230.

The clock signal selection circuit 230 selects several signals, from the delay clock signals CK0 to CKn-1, as modulation clock signals MCK0 to MCKm-1 according to the modulation pattern signal MPS, wherein m is a positive integer, and m≦n.

The waveforms of the modulation clock signals MCK0 to MCKm-1 are modulation waveforms in the frequency domain, wherein the modulation waveform may be, for example, a sine waveform, a triangle waveform, a Hershey kiss waveform, an exponential waveform, a square waveform, or the like.

The programmable counter 240 generates a counting value CV according to the counter clock signal CNT_CLK. The counting value CV may have various modes including, for example: (a) an up-down recycle mode, in which the variation of the counting value CV is: 0→1→ . . . m-2→m-1→m-2 . . . 1→0→1 . . . ; (2) an up-forward recycle mode, in which the variation of the counting value CV is: 0→1→ . . . m-2→m-1→0→1 . . . m-2→m-1→0 . . . ; and (3) a down-backward recycle mode, in which the variation of the counting value CV is: m-1→m-2→ . . . 1→0→m-2→ . . . 1→0. In addition, the format of the counting value CV is in gray code to avoid the glitch effectively. The counting value CV has k bits, wherein k is a positive integer, and $2^k \geq m$.

If the programmable counter 240 generates the counting value CV according to the rising edge of the counter clock signal CNT_CLK, the high level cycle of the output clock signal OUT is changed when the counting value CV is updated. On the contrary, if the programmable counter 240 generates the counting value CV according to the falling edge of the counter clock signal CNT_CLK, the low level cycle of the output clock signal OUT is changed when the counting value CV is updated.

The clock signal output unit 250 combines the modulation clock signals MCK0 to MCKm-1 into the output clock signal OUT according to the counting value CV. For example, when the counting value CV is equal to 0, OUT=MCK0; and when the counting value CV is equal to 2, OUT=MCK2, and so on.

The clock signal output unit 250 selects one from the modulation clock signals MCK0 to MCKm-1 and the output clock signal OUT as the counter clock signal CNT_CLK according to the counter clock signal control signal CNT_CLK_CTL. The counter clock signal CNT_CLK is inputted to the programmable counter 240.

When the average frequency of the output clock signal OUT is higher than the frequency of the input clock signal IN, it is referred to as up spreading. When the average frequency of the output clock signal OUT is lower than the frequency of the input clock signal IN, it is referred to as down spreading. When the average frequency of the output clock signal OUT is equal to the frequency of the input clock signal IN, it is referred to as center spreading.

Hereinafter, an example, in which m=8, the modulation waveform is the Hershey kiss waveform and the spreading is in the center spreading, will be illustrated.

Figure 3:
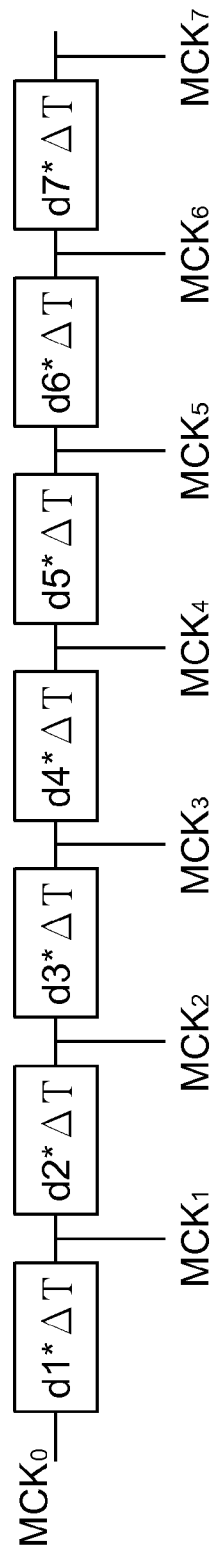
FIG. 3 shows phase differences between modulation clock signals.

FIG. 3 shows phase differences between modulation clock signals MCK0 to MCK7. As shown in FIG. 3, the phase difference between the modulation clock signals MCK0 and MCK1 is d1*ΔT, and so on, wherein d1 to d7 are positive integers, and ΔT represents the delay amount of the delaying unit.

Figure 4A:
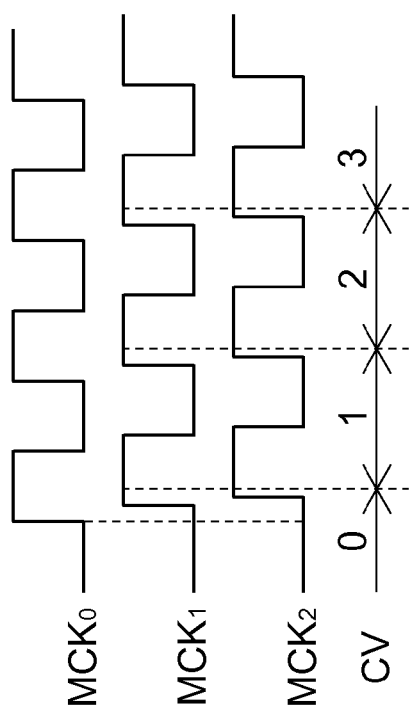
FIG. 4A is a timing chart showing variations of counting values.

In addition, in order to avoid the glitch, the transition of the counting value CV falls within the high level cycle (if the programmable counter 240 generates the counting value CV according to the rising edge of the counter clock signal CNT_CLK) or the low level cycle (if the programmable counter 240 generates the counting value CV according to the falling edge of the counter clock signal CNT_CLK) of the modulation clock signals MCK0 to MCK7. For example, the transition of the counting value CV from 0 to 1 falls within the high level cycle or the low level cycle of both the clock signals MCK0 and MCK1, as shown in FIG. 4A.

Figure 4B:
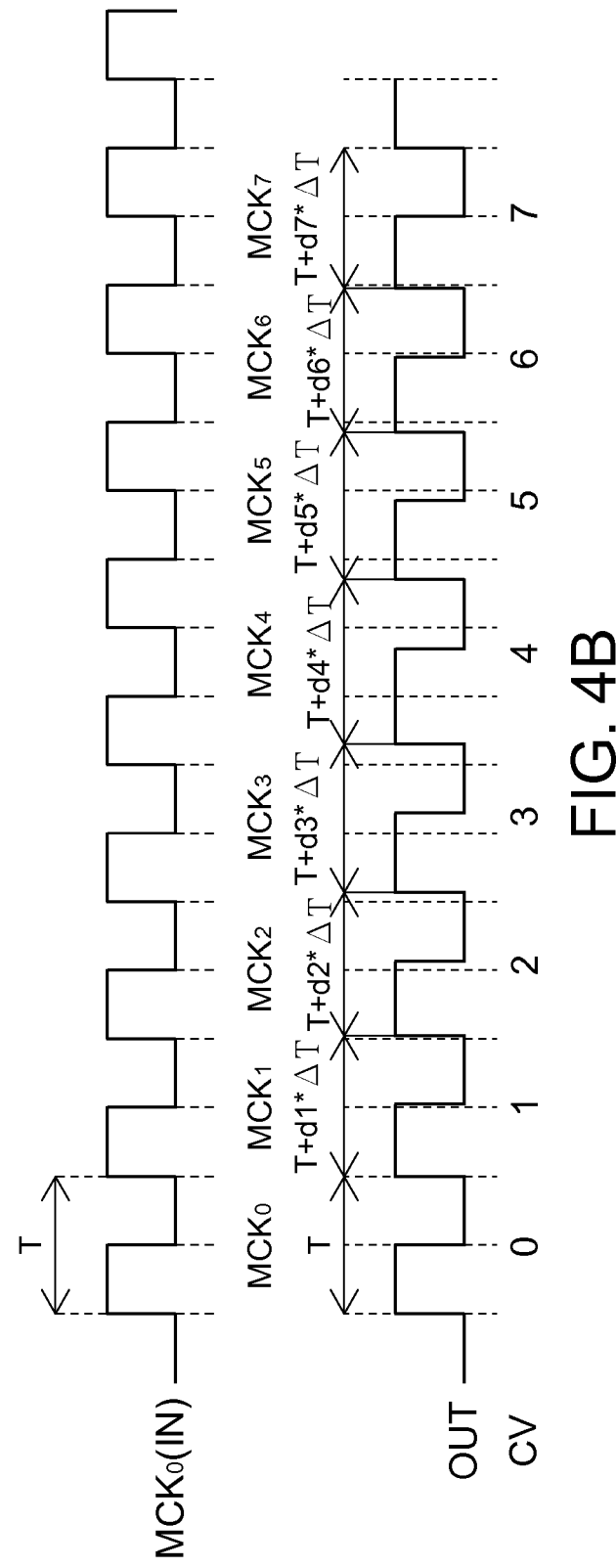
FIG. 4B shows how an output clock signal is generated by way of combination according to the counting values.

FIG. 4B shows how the output clock signal OUT is generated by way of combination according to the counting values CV, wherein T represents the cycle of the input clock signal IN. When the counting value CV is equal to 0, the modulation clock signal MCK0 is outputted as the output clock signal OUT, and so on. The frequency of the output clock signal OUT is changed with time to achieve the spectrum spreading.

Figure 5:
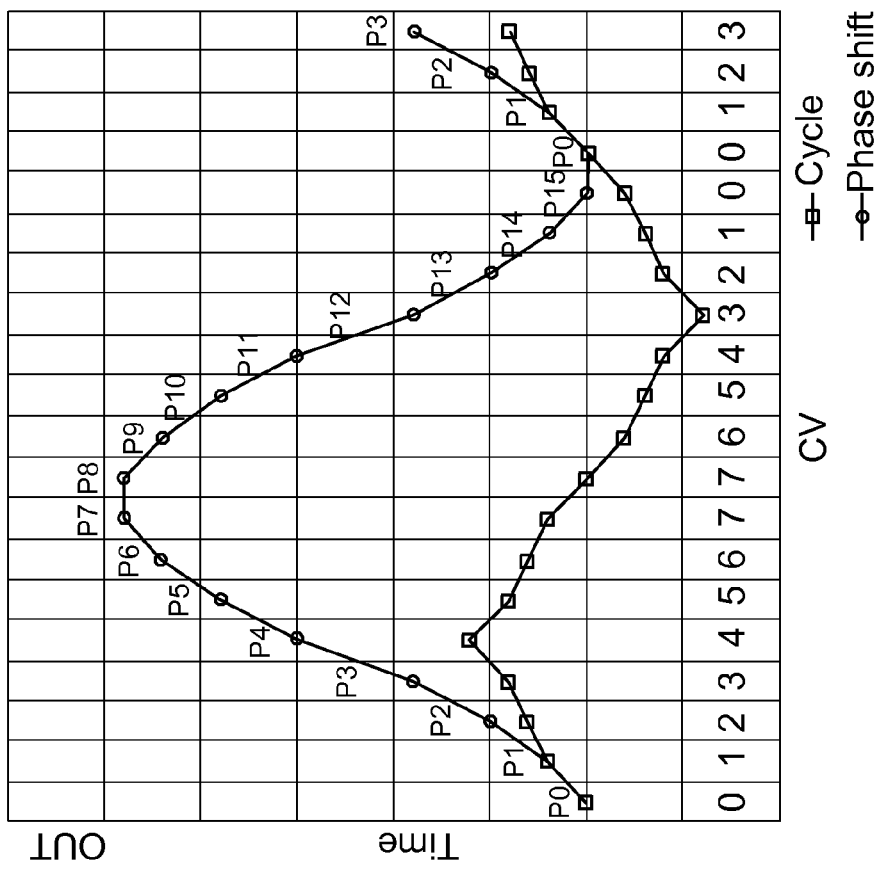
FIG. 5 shows cycles and phase shifts of the output clock signal.

FIG. 5 shows cycles and phase shifts of the output clock signal OUT, wherein the horizontal axis represents the counting value CV. For example, when the counting value CV is equal to 1, the cycle of the output clock signal OUT is T+d1*ΔT (because the modulation clock signal MCK1 is output as the output clock signal OUT), its corresponding phase shift is P1. As shown in FIG. 5, the modulation waveform is in the Hershey kiss waveform, and the average cycle of the output clock signal OUT is equal to T.

When the counting value CV is changed, only one bit of the gray code of FIG. 5 is changed, for reducing the glitch. For example, when the counting value CV is changed from 3 to 4, the gray code is changed from 010 to 110, and only one bit is changed. However, if the counting value CV is represented in a binary code and when the counting value CV is changed from 3 to 4, the binary code is changed from 011 to 100 which means 3 bits are changed and the glitch (signal discontinuity) tends to occur.

Figures 6, 7:
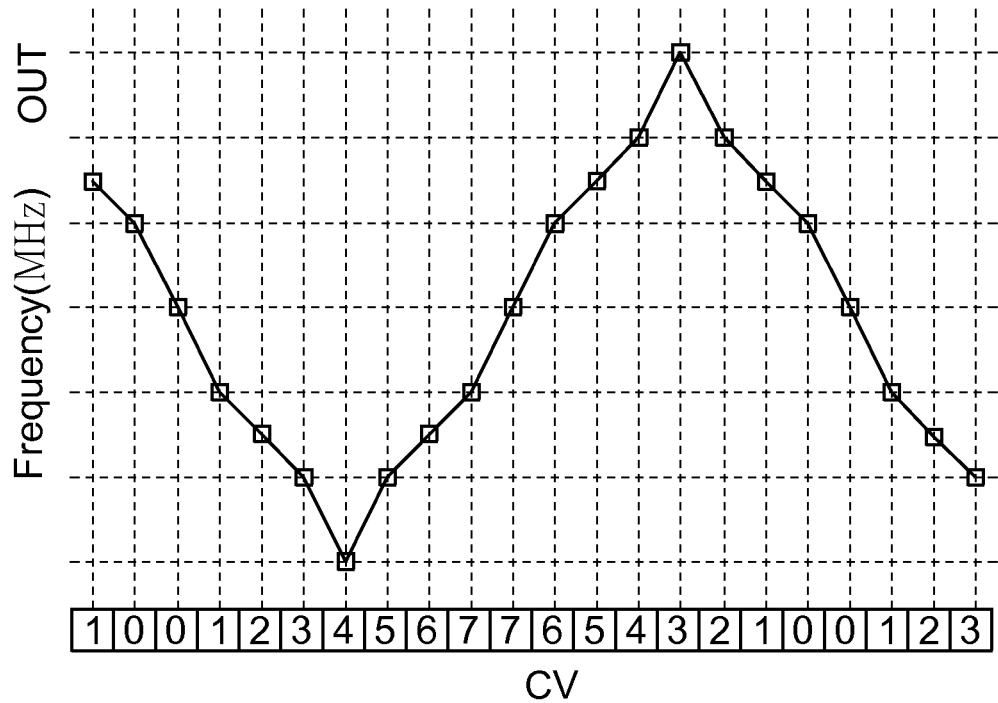
FIG. 6 shows the frequency of the output clock signal.
FIG. 7 shows the cycles and the phase shifts of the output clock signal when the modulation waveform is an exponential waveform.

FIG. 6 shows the frequency of the output clock signal OUT, wherein the horizontal axis represents the counting value CV. As shown in FIG. 6, the average frequency of the output clock signal OUT is equal to the frequency of the input clock signal IN.

Now, how the counter clock signal CNT_CLK is generated to effectively avoid the glitch will be explained.

When the programmable counter 240 generates the counting value CV in the ascending manner, the clock signal output unit 250 delays the output clock signal OUT by a delay time to generate the counter clock signal CNT_CLK. The delay time is greater than the maximum of the phase differences between the adjacent modulation clock signals of the modulation clock signals MCK0 to MCKm-1. As shown in FIG. 3, for example, the delay time is greater than the maximum one of d1*ΔT to d7*ΔT. For example, when the counting value CV is changed from 1 to 2, the high levels of the modulation clock signals MCK1 and MCK2 have to be sampled at the rising edge of the counter clock signal CNT_CLK (i.e., the rising edge of the output clock signal OUT).

Alternatively, when the programmable counter 240 generates the counting value CV in the ascending manner, the clock signal output unit 250 further receives the counting value CV and thus selects one of the modulation clock signals MCK0 to MCKm-1 as the counter clock signal CNT_CLK. For example, when the counting value CV is changed from 1 to 2, one of the modulation clock signals MCK3 to MCK7 (e.g., MCK3) may serve as the counter clock signal CNT_CLK, wherein the high levels of the modulation clock signals MCK1 and MCK2 have to be sampled at the rising edge of the counter clock signal CNT_CLK.

On the other hand, when the programmable counter 240 generates the counting value CV in the descending manner, the clock signal output unit 250 treats the output clock signal OUT as the counter clock signal CNT_CLK. For example, when the counting value CV is changed from 2 to 1, the output clock signal OUT serves as the counter clock signal CNT_CLK, wherein the high level of the modulation clock signal MCK1 has to be sampled at the rising edge of the counter clock signal CNT_CLK.

Figure 8:
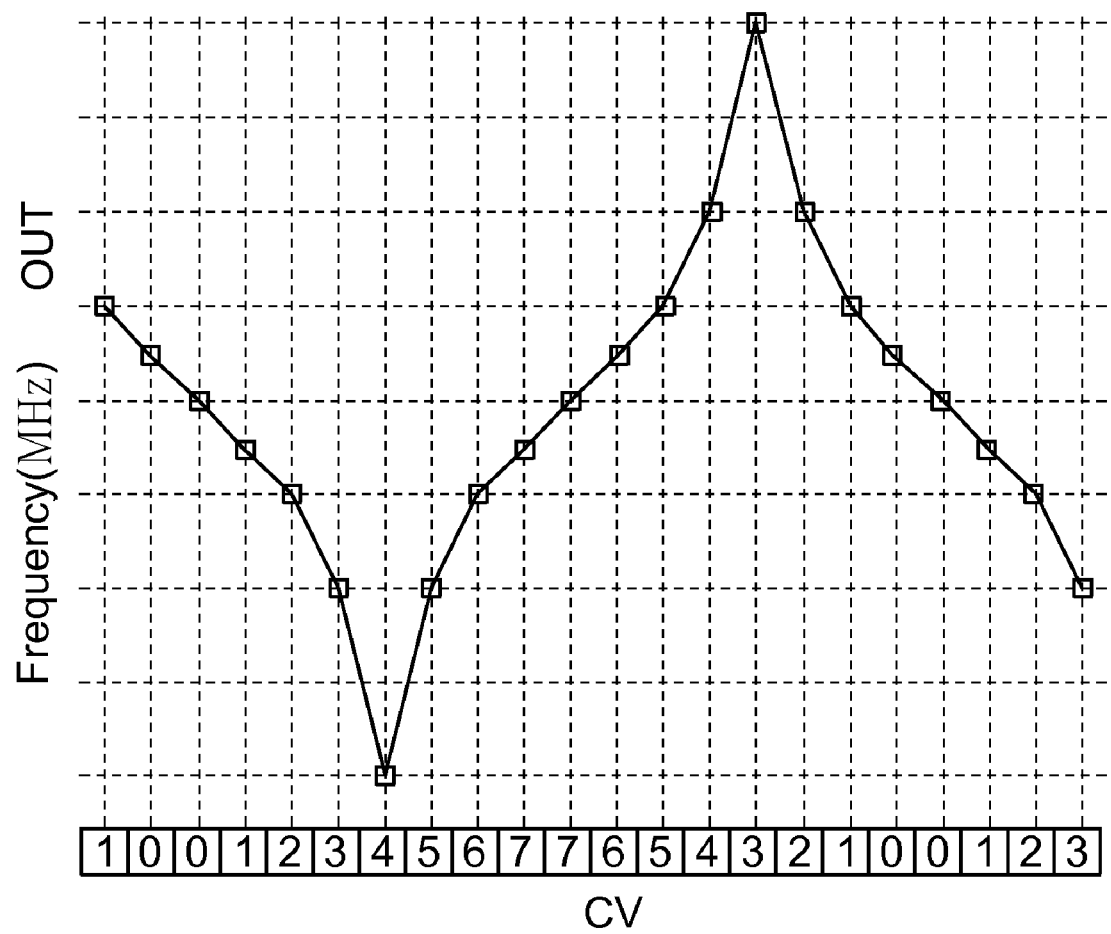
FIG. 8 shows the frequency of the output clock signal when the modulation waveform is the exponential waveform.

In addition, if the modulation waveform is in the exponential waveform, FIG. 7 shows the cycles and the phase shifts of the output clock signal OUT, and FIG. 8 shows the frequency of the output clock signal OUT, wherein the horizontal axis represents the counting value CV.

Second Embodiment

Figure 9:
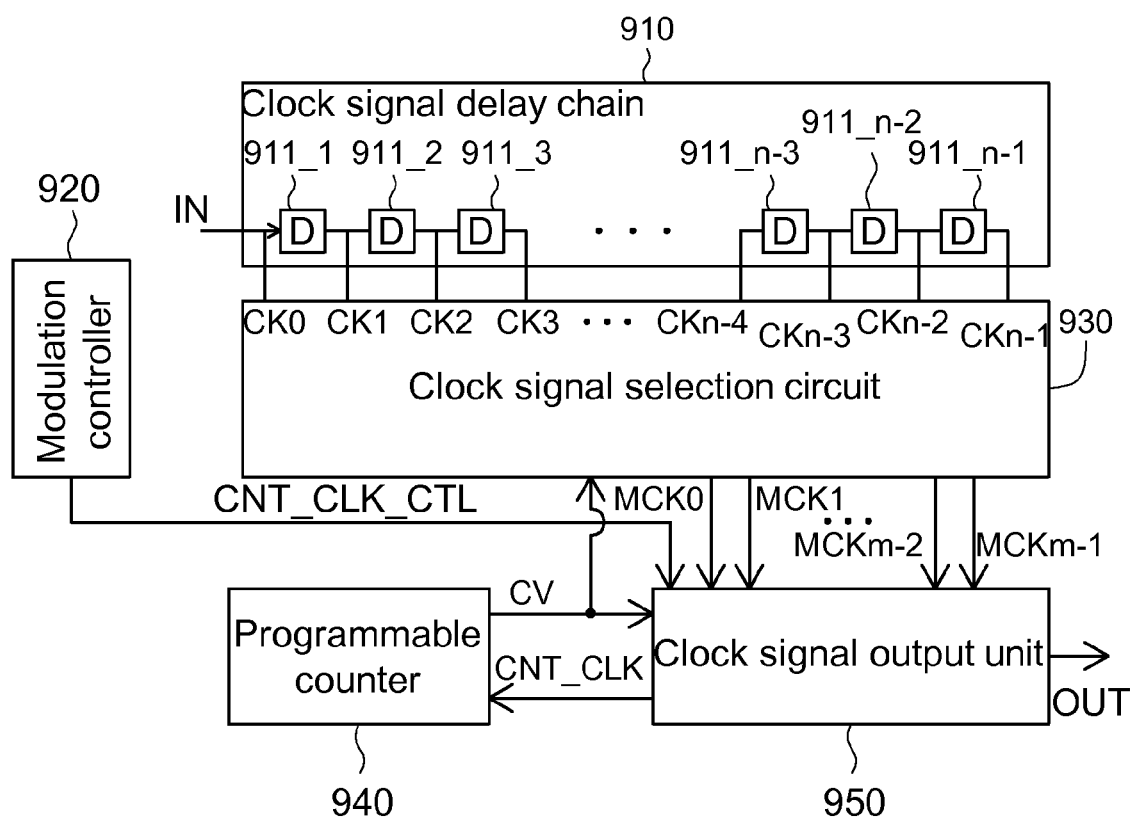
FIG. 9 is a circuit block diagram showing a spread spectrum clock signal generator according to a second embodiment of the invention.

FIG. 9 is a circuit block diagram showing a spread spectrum clock signal generator 900 according to a second embodiment of the invention. Referring to FIG. 9, the spread spectrum clock signal generator 900 includes a clock signal delay chain 910, a modulation controller 920, a clock signal selection circuit 930, a programmable counter 940 and a clock signal output unit 950. The elements 910, 940 and 950 are similar to or the same as the elements 210, 240 and 250 of FIG. 2, so detailed thereof will be omitted. The clock signal delay chain 910 includes a plurality of cascaded delaying units 911_1 to 911_n-1.

The clock signal selection circuit 930 receives the counting value CV and, based on the counting value CV, selects some signals from the delay clock signals CK0 to CKn-1 to serve as the modulation clock signals MCK0 to MCKm-1. It is assumed that n=20 and m=8. For example, when the counting values CV are respectively 0, 1, 2, 3, 4, 5, 6 and 7, the signals CK0, CK3, CK5, CK9, CK11, CK14, CK17 and CK19 respectively serve as the modulation clock signals MCK0, MCK1, MCK2, MCK3, MCK4, MCK5, MCK6 and MCK7.

In summary, the embodiments of the invention at least have the following advantages.

First, the high flexibility of generating the output clock signal is obtained because different output clock signals may be obtained by way of combination by changing the modulation.

Second, the glitch can be effectively avoided. The format of the counting value is the gray code, so the discontinuous problem of the clock signal and the glitch can be avoided. The high level/low level of the associated modulation clock signal has to be sampled at the rising/falling edge of the counter clock signal, so the problem of glitch may also be avoided.

Third, the circuit area may be saved. The counting value may be generated in a descending/ascending manner, so the circuit area of the counter may be saved.

Fourth, the embodiments of the invention may be adapted to the high-frequency circuit. In the prior art, before the input clock signal is spread, it is frequency-divided first. Consequently, the frequency of the input clock signal cannot be too high. In this invention, however, the input clock signal is not to be frequency-divided before it is spread. So, embodiments of the invention may be adapted to the high-frequency input clock signal application.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A spread spectrum clock signal generator for spreading an input clock signal into an output clock signal, the spread spectrum clock signal generator comprising:
   a clock signal delay chain for delaying the input clock signal into a delay clock signal group having a plurality of delay clock signals;
   a modulation controller for outputting a counter clock signal control signal;
   a clock signal selection circuit, coupled to the clock signal delay chain, for selecting, from the delay clock signal group, a modulation clock signal group having a plurality of modulation clock signals;
   a programmable counter for generating a counting value according to a counter clock signal; and
   a clock signal output unit coupled to the modulation controller, the programmable counter and the clock signal selection circuit, wherein the clock signal output unit combines the modulation clock signals into the output clock signal according to the counting value, and the clock signal output unit generates the counter clock signal, outputted to the programmable counter, according to the counter clock signal control signal.

2. The generator according to claim 1, wherein if the programmable counter generates the counting value according to a rising edge of the counter clock signal, a high level of the output clock signal is changed when the programmable counter updates the counting value.

3. The generator according to claim 1, wherein if the programmable counter generates the counting value according to a falling edge of the counter clock signal, a low level of the output clock signal is changed when the programmable counter updates the counting value.

4. The generator according to claim 1, wherein when the programmable counter updates the counting value, at least two modulation clock signals of the modulation clock signal group relating to the counting value are in high levels.

5. The generator according to claim 1, wherein when the programmable counter updates the counting value, at least two modulation clock signals of the modulation clock signal group relating to the counting value are in low levels.

6. The generator according to claim 1, wherein the clock signal delay chain comprises a plurality of cascaded delaying units, each of which outputs one of the delay clock signals.

7. The generator according to claim 1, wherein when the programmable counter generates the counting value in an ascending manner, the clock signal output unit delays the output clock signal by a delay time to generate the counter clock signal.

8. The generator according to claim 7, wherein the delay time relates to a maximum phase difference between the adjacent two modulation clock signals of the modulation clock signals.

9. The generator according to claim 1, wherein when the programmable counter generates the counting value in a descending manner, the clock signal output unit treats the output clock signal as the counter clock signal.

10. The generator according to claim 1, wherein when the programmable counter generates the counting value in an ascending manner, the clock signal output unit further receives the counting value and selects at least one of the modulation clock signals, corresponding to the current counting value, as the counter clock signal according to the current counting value.

11. The generator according to claim 1, wherein the counting value is in gray code.

12. The generator according to claim 1, wherein the number of the modulation clock signals is smaller than the number of the delay clock signals.

13. The generator according to claim 1, wherein the counting value is one of a plurality of candidate values, each of the candidate values corresponds to at least one of the modulation clock signals, the clock signal output unit serves the modulation clock signal, corresponding to the current counting value, as the output clock signal.

14. The generator according to claim 13, wherein the counting value is sequentially increased or decreased, and each of the modulation clock signals corresponds to one of the candidate values.

15. The generator according to claim 1, wherein the clock signal selection circuit receives the counting value and selects, from the delay clock signal group, the modulation clock signal group according to the counting value.

16. The generator according to claim 1, wherein the modulation controller generates a modulation pattern signal, and the clock signal selection circuit receives the modulation pattern signal and selects, from the delay clock signal group, the modulation clock signal group according to the modulation pattern signal.

* * * * *